(12) United States Patent
van Klooster et al.

(10) Patent No.: US 8,127,613 B2
(45) Date of Patent: Mar. 6, 2012

(54) ULTRASONIC TRANSDUCER

(75) Inventors: Jereon Martin van Klooster, Tiel (NL); Arie Huijzer, Sliedrecht (NL)

(73) Assignee: Krohne AG, Basel (CH)

( * ) Notice: Subject to any disclaimer, the term of this patent is extended or adjusted under 35 U.S.C. 154(b) by 393 days.

(21) Appl. No.: 12/503,483

(22) Filed: Jul. 15, 2009

(65) Prior Publication Data

US 2010/0011867 A1    Jan. 21, 2010

(30) Foreign Application Priority Data

Jul. 15, 2008   (DE) .......................... 10 2008 050 040

(51) Int. Cl.
*G01N 29/00*    (2006.01)

(52) U.S. Cl. ............................... 73/632; 73/596; 73/644

(58) Field of Classification Search .................... 73/644, 73/624, 625, 628, 626, 641, 532, 584, 596
See application file for complete search history.

(56) References Cited

U.S. PATENT DOCUMENTS

| | | | |
|---|---|---|---|
| 3,857,287 A * | 12/1974 | Sonderegger et al. | 73/706 |
| 3,960,018 A * | 6/1976 | Change et al. | 73/723 |
| 4,061,035 A * | 12/1977 | Witzke et al. | 73/715 |
| 5,034,848 A * | 7/1991 | Rowlette et al. | 361/283.3 |
| 5,159,580 A * | 10/1992 | Andersen et al. | 367/132 |
| 5,174,157 A * | 12/1992 | Obermeier et al. | 73/715 |
| 5,280,724 A * | 1/1994 | Higo et al. | 73/624 |
| 5,437,194 A | 8/1995 | Lynnworth | |
| 6,940,211 B2 * | 9/2005 | Pelrine et al. | 310/330 |
| 7,086,286 B1 | 8/2006 | McCarey, Jr. et al. | |
| 7,694,573 B2 * | 4/2010 | Giordano | 73/722 |

FOREIGN PATENT DOCUMENTS

WO  96/18181 A1  6/1996

* cited by examiner

*Primary Examiner* — J M Saint Surin
(74) *Attorney, Agent, or Firm* — Roberts Mlotkowski Safran & Cole, P.C.; David S. Safran

(57) ABSTRACT

An ultrasonic transducer for installation in an instrument housing, the ultrasonic transducer having a transducer housing and a housing fixture, the transducer housing being put under pressure by a medium in its installed state on its emitting and/or receiving side. To provide an ultrasonic transducer for installation in an instrument housing, which implements a measure for avoiding crosstalk of ultrasonic signals and avoids the disadvantages known from the prior art—at least partially, the ultrasonic transducer is wherein the transducer housing indirectly forms at least one contact area in its installed state with the housing fixture, the transducer housing and the housing fixture being at least indirectly pressed against one another in a first contact area with existing, but as slight as possible, surface pressure by a pre-loading mechanism.

15 Claims, 4 Drawing Sheets

ULTRASONIC TRANSDUCER

BACKGROUND OF THE INVENTION

1. Field of Invention

The invention relates to an ultrasonic transducer for installation in an instrument housing, wherein the ultrasonic transducer comprises a transducer housing and a housing fixture and wherein the transducer housing can be put under a medium pressure in its installed state on its emitting and/or receiving side.

2. Description of Related Art

Ultrasonic transducers of the above-mentioned type have been known for years and are, for example, used in acoustic mass flowmeters to a wide extent. The ultrasonic transducer transforms electric energy in the oscillation of a membrane that is provided on the emitting and/or receiving side in the transducer housing; in this case, the ultrasonic transducer acts as an ultrasonic emitter. By the same token, it is also possible that a membrane provided on the emitting and/or receiving side is oscillated by external—occurring in the medium—pressure fluctuations and the oscillation is transformed into a respective signal; in this case, the ultrasonic transducer acts as an ultrasonic receiver. In some applications—as, e.g., fill level measurement—such an ultrasonic transducer is used as both an ultrasonic emitter and an ultrasonic receiver, in the field of mass flow measurement, an ultrasonic transducer is commonly used either as an ultrasonic emitter or as an ultrasonic receiver.

In acoustic mass flow measurement, the effect is usually used that the propagation speed of the acoustic signal is superimposed on the rate of feed of the medium in a medium transported in a measuring tube. The measured propagation speed of the acoustic signal compared to the measuring tube is greater than in a recumbent medium when the medium is transported in the direction of the acoustic signal and the speed of the acoustic signal compared to the measuring tube is less than in a recumbent medium when the medium is transported against the direction of emission of the acoustic signal. The run time of the acoustic signal between the acoustic emitter and the acoustic receiver—both are ultrasonic transducers—depends on the rate of feed of the medium compared to the measuring tube and thus, due to the entrainment effect, compared to the acoustic emitter and the acoustic receiver.

It is a problem for measurements based on emitted acoustic or ultrasonic signals, not only in the field of mass flow measurement, that the ultrasonic oscillation created in the ultrasonic transducer are not only transmitted by the emitting and/or receiving side of the transducer housing in the surrounding medium of the ultrasonic transducer, but that the created oscillations are transmitted to the instrument housing via the transducer housing—as the case may be, via the housing fixture, insofar as it differs from the instrument housing. This is not only a problem because, under certain circumstances, a considerable portion of the transmission power is "lost", rather is a problem because the ultrasonic waves transmitted to the instrument housing by so-called crosstalk can lead to considerable receiving-side interference. This is accounted for in that, for example, it cannot be differentiated on the receiver side if the received ultrasonic signal was received via the medium—wanted signal—or via the instrument housing, wherein the ultrasonic signal transmitted via the instrument housing, then again creates crosstalk in the transducer housing of the receiving ultrasonic transducer.

In particular, in gas applications, in which the medium is comprised of gas, the portion of the oscillation energy transmitted from the ultrasonic transducer into the gaseous medium compared to the total created oscillation energy is very low, so that the problem of crosstalk is particularly aggravating here.

Different methods are known from the prior art for reducing crosstalk in ultrasonic oscillations from actual oscillators in the transducer housing to the transducer housing and further to the instrument housing. Some of these methods are based on the transmission path from the ultrasonic generator—e.g., a piezo element on the emitting and/or receiving side of the transducer housing—to the transfer at the instrument housing being constructively lengthened. Other methods include attempts at acoustically decoupling the ultrasonic source from the rest of the ultrasonic transducer and/or from the instrument housing, for example by creating acoustic transfers with materials, which result in a poor impedance matching and, thus, cause transmission of a lower energy portion. Multiple methods are often combined with one another.

In gas applications, there is the additional problem that the portion of energy directly transmitted into the gaseous medium is strongly dependent on the pressure and, thus, the density of the medium. Pressure fluctuations lead to the ratio of the wanted signal energy to the crosstalk signal energy being highly varied, whereby the analysis of ultrasonic signals based on signal levels or signal level ratios is made more difficult.

SUMMARY OF THE INVENTION

A primary object of the present invention is, thus, to provide an ultrasonic transducer for installation in an instrument housing, which implements a further measure for avoiding crosstalk of ultrasonic signals and avoids the disadvantages known from the prior art—at least partially.

The acoustic ultrasonic transducer according to the invention in which the above derived and depicted object is met, is first and essentially wherein the transducer housing forms, at least indirectly, at least one contact area in its installed state with the housing fixture, the transducer housing and the housing fixture being at least indirectly pressed against one another in a first contact area with existing, but as slight as possible surface pressure by a pre-loading means. By mounting the transducer housing with a low as possible surface pressure in the housing fixture, an outstanding acoustic decoupling is achieved between the transducer housing, on the one hand, and the housing fixture, on the other hand, so that crosstalk of ultrasonic waves is effectively reduced. Since, on the whole, an—even if as small as possible—at least indirect surface pressure between the housing fixture and the transducer housing is implemented, housing fixtures and transducer housing are mounted defined to one another so that the ultrasonic transducer has a defined outer geometry even when it is not placed under pressure from the medium.

The method according to the invention is based on the knowledge that acoustic and, thus, ultrasonic transmission between two solid bodies is not only dependent on material characteristics and geometry, but also on how the junction between the solid bodies is defined. The acoustic transmission from a solid body to an adjacent solid body is, for example, also dependent on whether these adjacent solid bodies are pressed against one another, with what force they are pressed against one another—or, respectively, what surface pressure is implemented in the contact area—or if these adjacent solid bodies only lie next to one another without any force. With increasing surface pressure, the acoustic transmission between two solid bodies is improved. It is, thus, achieved with the construction of the pre-loading means that a slight as possible initial surface pressure and, therewith, the ability of acoustic transmission in the ultrasonic transducer is realized at a defined position of the housing fixture and the transducer housing in relation to one another.

Transducer housings of ultrasonic transducers are normally longitudinally oriented, wherein the actual ultrasonic source is found on an end of this longitudinally oriented transducer housing, usually in the form of a piezo-crystal. This piezo-crystal oscillates a membrane, whereby ultrasonic waves are emitted in the axially oriented direction of the transducer housing.

On the same token, this means that a pressure of the surrounding medium present outside of the transducer housing has an effect on the transducer housing, a resulting pressure load and, therewith, a resulting action of force only takes place in this axial direction of the longitudinal orientation of the transducer housing, namely on the membrane provided on the emitting and/or receiving side. The present medium pressure thus causes a resulting action of force P on the transducer housing, in normal constructions, in the axial direction of the transducer housing.

According to a preferred embodiment of the invention, it is provided that the force, with which the transducer housing is pressed at least indirectly against the housing fixture in the pressure-loaded installed state is dependent on the resulting pressure load of the transducer housing by the medium, the force and, thus, the surface pressure in the first surface area also increasing with increasing medium pressure. The aforementioned knowledge is used in this method in that the transmission of ultrasonic waves from a solid body to another solid body is stimulated in that the surface pressure in the contact area between both solid bodies—here transducer housing and housing fixture—is increased.

At the same time, the surface pressure between the housing fixture and the transducer housing is also conveyed indirectly via a solid body found between the housing fixture and the transducer housing, then, the mentioned first contact area is formed between the housing fixture and the conveying solid body, on the one hand, and the conveying solid body and the transducer housing, on the other hand; this is what is meant when it is said that the transducer housing forms a first contact area indirectly with the housing fixture in the installed state, wherein then, inevitably a second contact area arises.

In a pressure-free—i.e., normal pressure—state of the medium, the transducer housing and the housing fixture contact one another—at least indirectly—due to specifications of the invention with a slight as possible surface pressure; practically no ultrasonic waves are transmitted from the transducer housing to the housing fixture. In the above-described mounting of the transducer housing in the housing fixture, the force with which the transducer housing is pressed against the housing fixture—in the direction of the resulting pressure load—increases with increasing medium pressure. Thereby, crosstalk of ultrasonic waves from the transducer housing into the housing fixture is stimulated, on the one hand, and on the other hand, however, an increasing portion of the acoustic energy is emitted into the medium.

Primarily in gaseous media, increasing media pressure goes hand in hand with increasing density of the medium, so that in the degree, in which the medium pressure increases and crosstalk of ultrasonic waves from the transducer housing in the housing fixture is stimulated, the transmission of ultrasonic waves from the emitting and/or receiving side of the transducer housing is also stimulated in the medium. As a result, this method achieves that the ratio of wanted signal power to power of crosstalk remains the same, at any rate, changes less strongly when the medium pressure is changed than is the case in known constructions, in particular in such constructions, in which the surface pressure produced by pre-loading means is much greater than the surface pressure in the first contact area, which is a result of the load created by the medium.

Ultrasonic transducers according to the invention are preferred and designed so that the surface pressure—at least indirectly—caused by the pre-loading means is less than 10 MPa in the first contact area, especially less than 7 MPa, preferably less than 6 MPa and most preferably less than 5 MPa. In this context, it has proven advantageous when the surface pressure—at least indirectly—caused by the pre-loading means is greater than 0.001 MPa in the first contact area, especially greater than 0.005 MPa, preferably greater than 0.01 MPa and most preferably greater than 0.05 MPa. It has been shown that ultrasonic transducers having a surface pressure in the first contact area of between 0.05 MPa and 5 MPa can be easily implemented in production.

In a most preferred embodiment of the ultrasonic transducer according to the invention, it is provided that the pre-loading means is effective between the transducer housing and the housing fixture so that the pre-loading means is increasingly unloaded with increasing medium pressure. This embodiment and arrangement of the pre-loading means leads to an additional compensation effect in view of ultrasonic transmission. It is, thus, clear that in order to apply the—at least indirectly acting—surface pressure between the housing fixture and the transducer housing, the pre-loading means has to be in contact—if not directly, then mechanically indirectly—with the housing fixture and the transducer housing, so that an acoustic bridge is also formed here between the transducer housing and the housing fixture. The contact areas between the pre-loading means and the transducer housing or, respectively between the pre-loading means and the housing fixture are subject to the same principle of increasing acoustic transmission ability with increasing surface pressure. However, when the pre-loading means is arranged and installed as described above, the acoustic transmission from the transducer housing to the housing fixture is improved at increasing medium pressure, however, the acoustic transmission ability of the pre-loading means decreases simultaneously due to the decreasing surface pressure there.

In one variation of the ultrasonic transducer according to the invention, it is provided that the housing fixture comprises a first fixture element and a second fixture element, wherein the first fixture element and the second fixture element form a free space in the assembled state, in which a section of the transducer housing is mounted, wherein the section of the transducer housing is—directly or indirectly—supported in the direction of and opposite the direction of the resulting pressure load on the first fixture element and on the second fixture element, i.e. the first housing fixture and the second housing fixture virtually clamp the section and, all in all, thus keep hold of the transducer housing. Based on this variation, it is, in particular, provided that the first fixture element is formed by a section of the instrument housing provided with a recess, wherein the transducer housing can be inserted in the recess of the instrument housing and that the second fixture element is formed by a sleeve that can be inserted in the recess of the section of the instrument housing and can be connected to the section of the instrument housing.

The contact pressure can be particularly easily adjusted in the last-mentioned variation if the second fixture element can be screwed into the first fixture element and the pre-loading means is implemented by interaction of the thread of the second fixture element with the corresponding pitch of the first fixture element.

A further improvement in the suppression of ultrasonic transmission is achieved by a preferred embodiment of the invention in that the transducer housing and the housing fixture are spaced from one another in the installed state in the direction of the resulting pressure load by a gap, wherein at least one acoustic decoupling element is arranged in the gap, wherein, in particular, material and/or dimensions of the decoupling element are chosen so that a low as possible resulting acoustic impedance matching is implemented between the transducer housing and the decoupling element and/or the decoupling element and the housing fixture. The poor impedance matching leads to only a small portion of the ultrasonic energy being transmitted to the contact area, in fact a larger portion of the ultrasonic waves are reflected, in any case, do not reach the housing fixtures or, respectively, the housing.

In detail, there are different possibilities for designing and further developing the ultrasonic transducer according to the invention as will become apparent from the following detailed description of preferred embodiments in connection with the accompanying drawings.

DETAILED DESCRIPTION OF THE INVENTION

Figure 1:
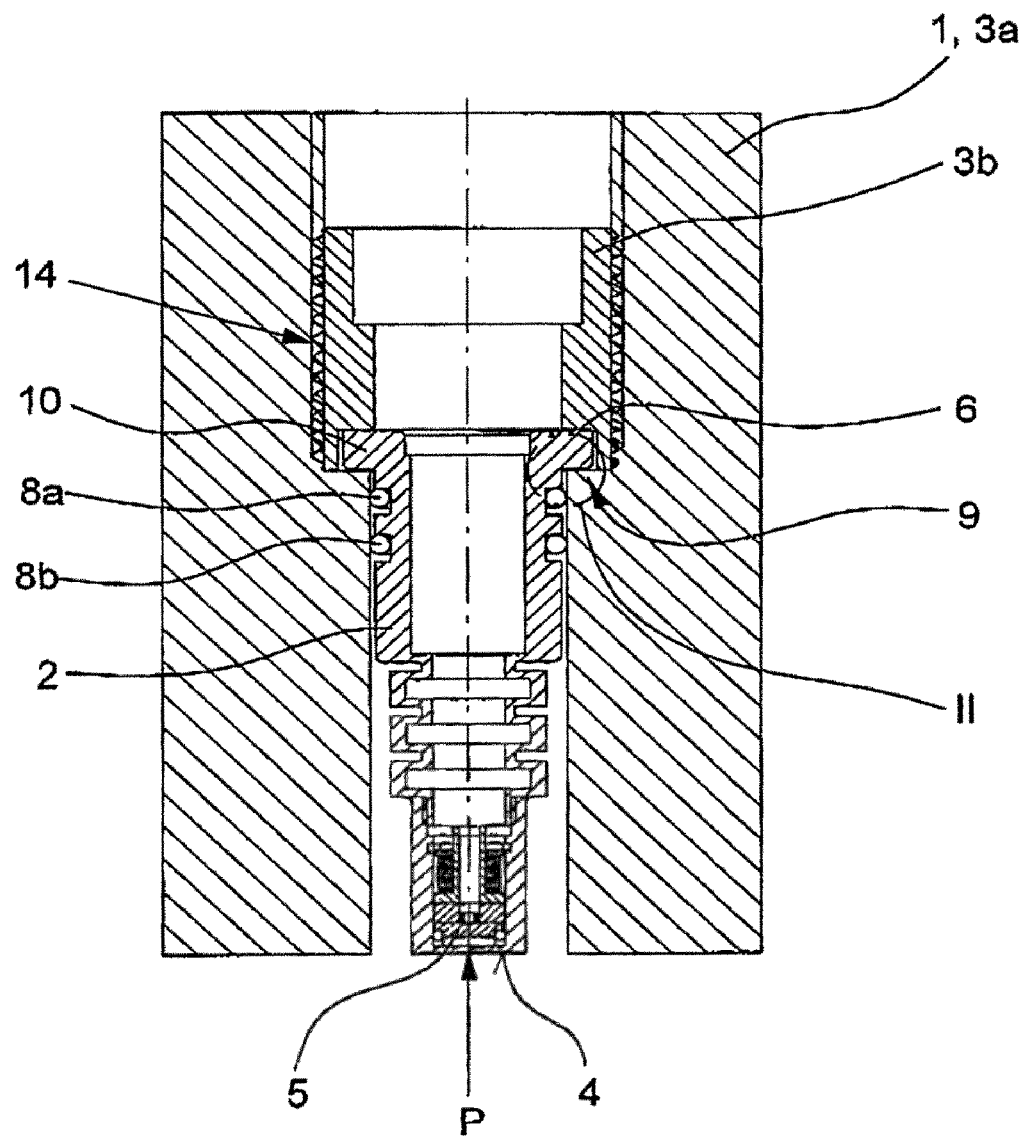
FIG. 1 is a cross-section through an ultrasonic transducer according to the invention in the installed state.
Figure 2:
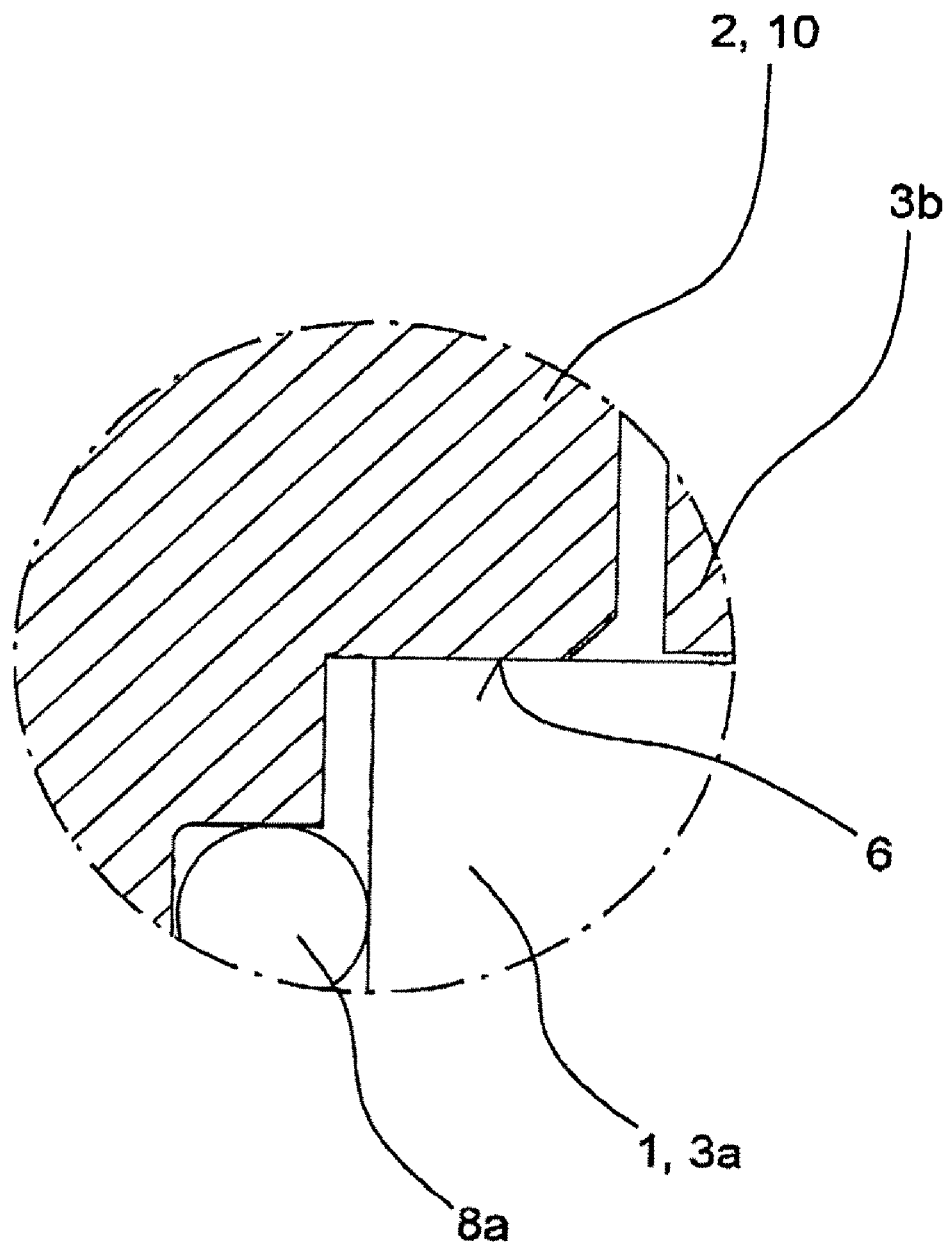
FIG. 2 is a detailed view of a junction from the transducer housing to the housing fixture according to FIG. 1.
Figure 3:
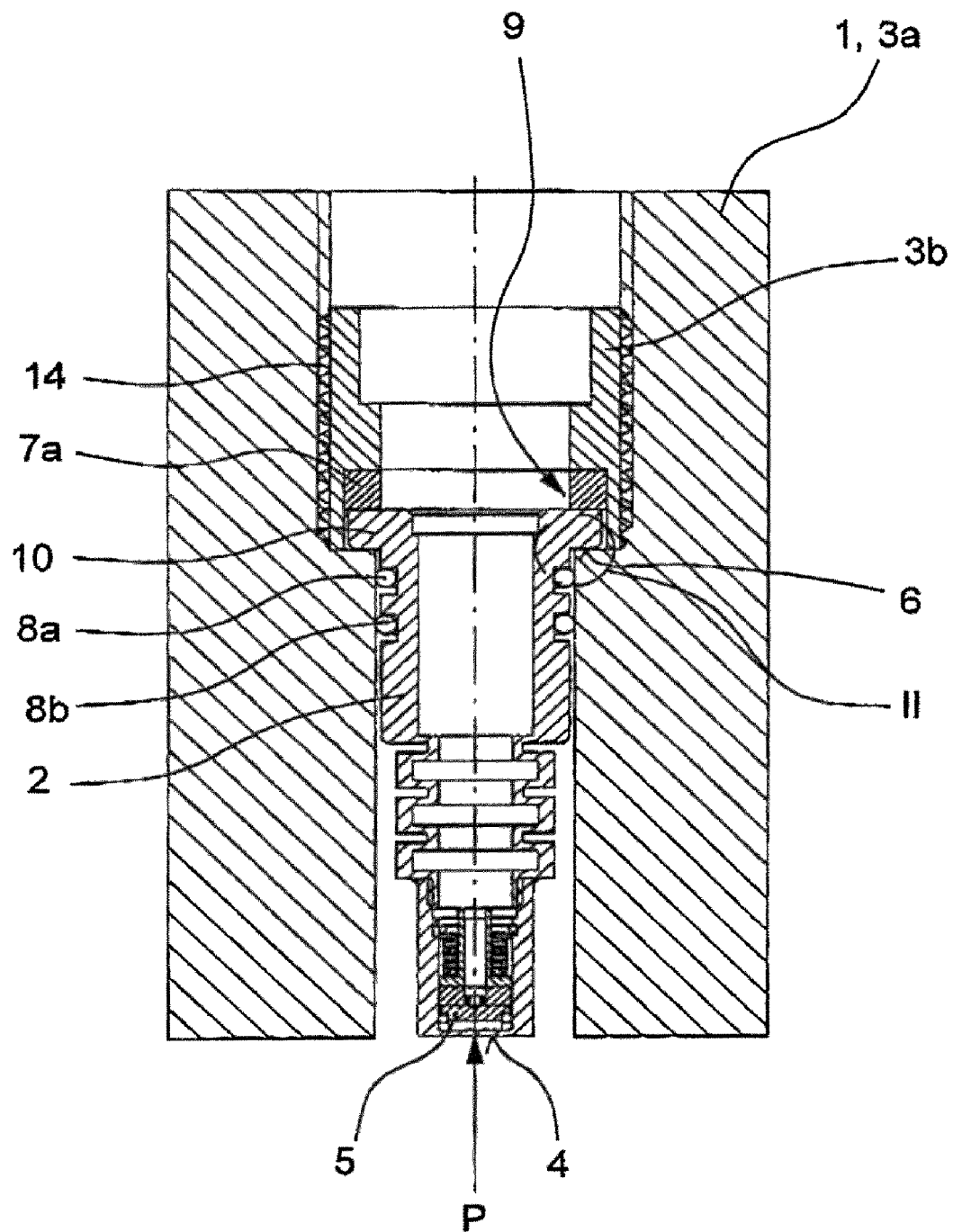
FIG. 3 is a further embodiment of an ultrasonic transducer according to the invention with an additional decoupling element and FIG. 4 is another embodiment of an ultrasonic transducer according to the invention having multiple decoupling elements.

FIGS. 1 to 4 show an ultrasonic transducer according to the invention, which is provided for installation in an instrument housing 1, wherein the instrument housing 1 is only illustrated in FIGS. 1 to 3. The ultrasonic transducer comprises a transducer housing and a housing fixture, wherein the transducer housing can be put under the pressure of a medium in its installed state on its emitting and/or receiving side; the medium is not explicitly illustrated in the figures.

The figures are schematic insofar as that only the constituents of interest of the ultrasonic transducer are shown. For example, the wiring of the actual ultrasonic exciter 5 is not shown, which is implemented as a piezo-element in the embodiments. It is presently not of importance whether the transducer housing 2 is made of one or two parts, how the head of the ultrasonic transducer is constructed in detail, and for example, of which material the ultrasonic transducer is made on its emitting and/or receiving side 4; this is also not exemplified in the following.

The illustrated ultrasonic transducers are characterized, in whole, in that the transducer housing 2 forms, at least indirectly, a contact area in its installed state with the housing fixture 3a, 3b, the transducer housing 2 and the housing fixture 3a, 3b being at least indirectly pressed against one another in a first contact area 6 with existing, but as slight as possible surface pressure by a pre-loading means 14. Thereby, it is achieved—as described above—that a poor acoustic transmission between the transducer housing 2 and the housing fixture 3a, 3b is realized having a simultaneously defined position of the transducer housing 2 opposite the housing fixture 3a, 3b.

It can be seen in the figures that the emitting and receiving side 4 of the ultrasonic transducer can be exposed to a medium, and as a result thereof, is exposed to the pressure prevailing in the medium. In the illustrated embodiments, this medium pressure leads to a resulting pressure load in the direction labeled P.

When it is said that the transducer housing 2 and the housing fixture 3a, 3b are pressed against one another with an existing, but slight as possible surface pressure, then this applies to surface pressure constructively contingent on the use of the pre-loading means 14, but not actions of force that result from external influences, i.e., for example, the weight or pressure exerted from the transducer housing 2 on the housing fixture 3a, 3b.

Because the transducer housing 2 and the housing fixture 3a, 3b are pressed against one another by the pre-loading means 14 with a slight as possible surface pressure—in particular in direction P of the possible resulting pressure load—, it is achieved that crosstalk of ultrasonic signals from the transducer housing 2 to the housing fixture 3a, 3b are avoided as far as possible for lack of a first contact area 6 necessary for ultrasonic transmission formed internally by a high surface pressure. Low surface pressure only allows for low ultrasonic transmission.

It is advantageous in all of the embodiments that the force with which the transducer housing 2 at least indirectly is pressed against the housing fixture 3a, 3b in at least the first contact area 6 in the medium-induced, pressure-loaded installed state is dependent on the resulting pressure on the transducer housing 2 by the medium, the force, and, thus the surface pressure in the first contact area 6 also increasing with increasing medium pressure. As has been mentioned above, this has a particular advantage for gaseous media in that, with increasing contact pressure of the transducer housing 2—direct or indirect—on the housing fixture 3a, 3b—i.e., with increasing surface pressure—crosstalk from ultrasonic signals finds improved conditions, but, at the same time, however, a better transmission of ultrasonic waves from the ultrasonic transducer to the medium is possible, so that the ratio of the power of the wanted signal to the power of crosstalk is only slightly or not even changed.

In the embodiments illustrated in the figures, the at least indirect surface pressure in the first contact area 6 caused by the pre-loading means 14 is about 2 MPa; a value that is easily manageable in terms of precision and construction.

Figure 4:
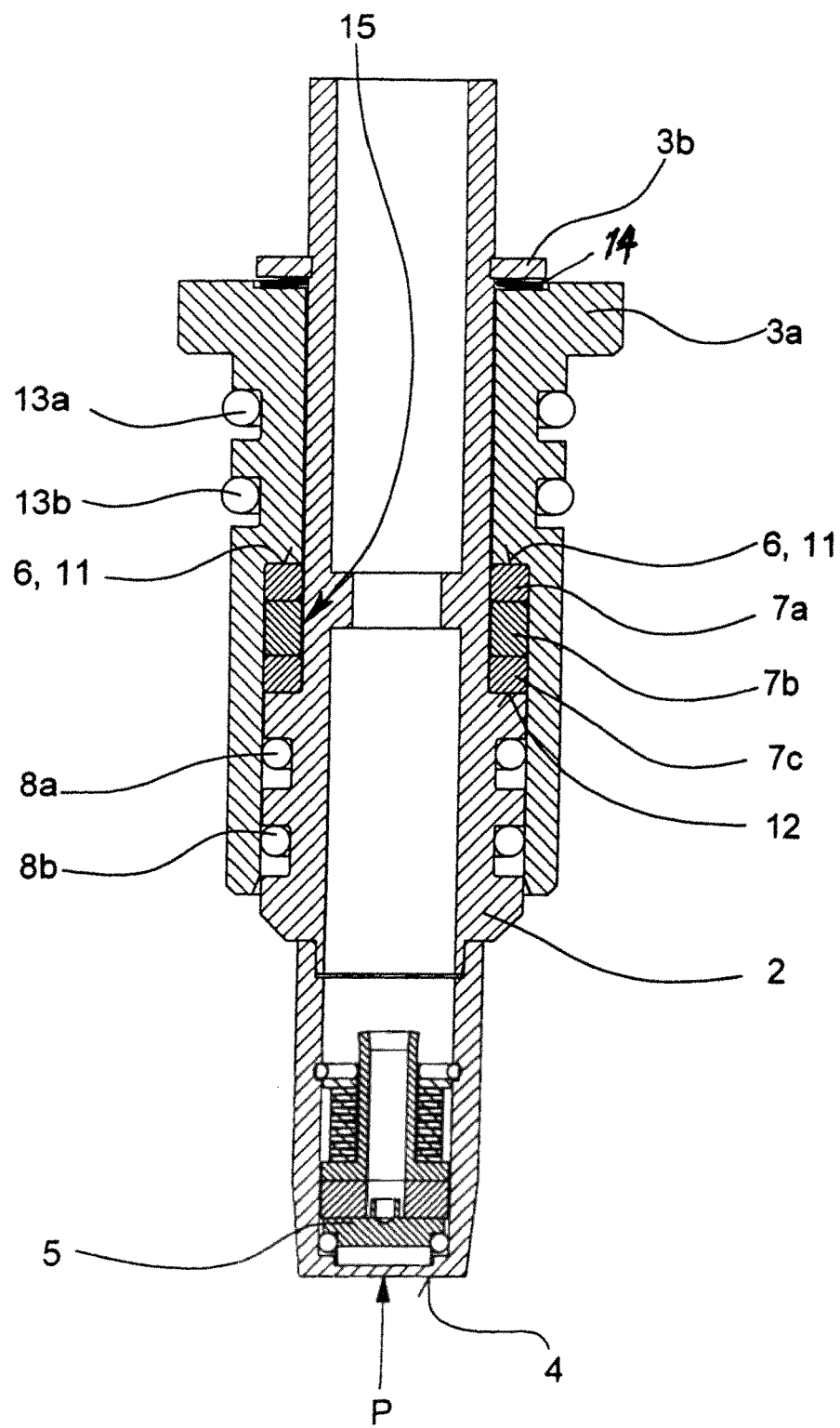

The ultrasonic transducer according to FIG. 4 is wherein the preloading means 14 is effective completely between the transducer housing 2 and the housing fixture 3a, 3b so that the pre-loading means 14 is increasingly unloaded with increasing medium pressure. This is achieved in the ultrasonic transducer according to FIG. 4 in that that the housing fixture 3a, 3b comprises a first fixture element 3a and a second fixture element 3b, wherein the transducer housing 2 runs through the first fixture element 3a, a shoulder 11 of the first fixture element 3a and a shoulder 12 of the second fixture element 3b are opposite one another on one side of the first fixture element 3a and, in the area of the other side of the first fixture element 3a, the second fixture element 3b is connected to the transducer housing 2 and is opposite in a locking manner from the first fixture element 3a, in particular, wherein the second fixture element 3b is a positive-locking retaining ring.

The pre-loading means 14 has direct contact with the first fixture element 3a and the second fixture element 3b in the ultrasonic transducer according to FIG. 4, wherein the second fixture element 3*b* feeds the force caused by the pre-loading means 14 into the transducer housing 2. When the transducer housing 2 is increasingly pressed into the housing fixture 3*a* due to increasing pressure, the gap in which the pre-loading means 14 is arranged between the first fixture element 3*a* and the second fixture element 3*b* becomes larger so that the force exerted by the pre-loading means 14 becomes smaller. Thereby, the surface pressure between the pre-loading means 14 and the first fixture element 3*a* and the second fixture element 3*b* also becomes smaller so that, with increasing medium pressure, the pre-loading means 14 is continuously less capable of transmitting ultrasonic waves from the transducer housing 2 to the housing fixture 3*a*, 3*b*.

In another variation, in which the pre-loading means 14 is provided between the first fixture element 3*a* and the second fixture element 3*b*, the pre-loading means 14 is supported, on the one hand, by the first fixture element 3*a* and, on the other hand, directly by the transducer housing 2, however, this is not shown. In FIG. 4, the pre-loading means 14 is formed as a spring washer, in particular as a domed or curved spring washer.

In the ultrasonic transducer illustrated in FIG. 1 to 3, the housing fixture 3*a*, 3*b* also comprises a first fixture element 3*a* and a second fixture element 3*b* wherein the first fixture element 3*a* and the second fixture element 3*b* form a free space 9 in which a section 10 of the transducer housing 2 is mounted, wherein the section 10 of the transducer housing 2 is—directly or indirectly—supported in direction P and opposite direction P of the resulting pressure load on the first fixture element 3*a* and on the second fixture element 3*b*. The first fixture element 3*a* is formed by a section of the instrument housing 1 provided with a recess, wherein the transducer housing 2 is inserted in the recess of the instrument housing 1. The second fixture element 3*b* is formed by a sleeve that can be inserted in the recess of the section of the instrument housing 1 and that can be connected with the section of the instrument housing 1. The second fixture element 3*b* can be screwed into the first fixture element 3*a* and the pre-loading means 14 is implemented by the interaction of the thread of the second fixture element 3*b* with the corresponding pitch of the first fixture element 3*a*. By measuring the torque when the sleeve is tightened, forces acting in the axial direction and, thereby, the entire effective surface pressure can be easily identified and determined so that the required existing, but slight as possible surface pressure can be easily adjusted.

The thread between the first fixture element 3*a* and the second fixture element 3*b* is designed so that the thread contact surfaces have a maximum surface pressure caused by the pre-loading means 14 of about 7 MPa.

In the embodiments according to FIGS. 3 and 4, the transducer housing 2 and the housing fixture 3*a*, 3*b* are spaced from one another in the installed state in direction P of the resulting pressure load by a gap 15, wherein at least one acoustic decoupling element 7*a* is arranged in the gap 15, wherein, in particular, material and/or dimensions of the decoupling element 7*a* are chosen so that a low as possible resulting acoustic impedance matching is implemented between the transducer housing 2 and the decoupling element 7*a* and/or the decoupling element 7*a* and the housing fixture 3*a*, 3*b*.

In the ultrasonic transducer according to FIG. 4, three acoustic decoupling elements 7*a*, 7*b*, 7*c* are arranged in the free space 15, namely, adjacent to one another in direction P of the resulting pressure load, wherein the material and/or dimension of the decoupling elements 7*a*, 7*b*, 7*c* are chosen so that a low as possible acoustic impedance matching results between the decoupling elements 7*a*, 7*b*, 7*c*.

The material of the decoupling elements 7*a*, 7*b*, 7*c* is chosen in view of its elasticity so that it can be compressed by the expected pressure load from the medium, so that the described unloading of the pre-loading element 14 occurs under a load.

In all of the illustrated embodiments, the transducer housing 2 is mounted spaced in the housing fixture 3*a*, 3*b* essentially perpendicular to direction P of the resulting pressure load, presently with sealing rings 8*a*, 8*b*. The sealing rings 8*a*, 8*b* are chosen in terms of material and dimensions so that a possible slight resulting acoustic impedance matching between the transducer housing 2 and the sealing rings 8*a*, 8*b* and the sealing rings 8*a*, 8*b* and the housing fixture 3*a*, 3*b* is realized.

In the ultrasonic transducer according to FIG. 4, the first fixture element 3*a* has sealing rings 13*a*, 13*b* around its circumference, with which the first fixture element 3*a* is sealed in the installed state of the ultrasonic transducer as compared with the instrument housing (not shown).

What is claimed is:

1. Ultrasonic transducer for installation in an instrument housing, comprising:
   a transducer housing, the transducer housing being exposed in an installed state thereon, on at least one of an emitting and a receiving side thereof, to pressure exerted by a medium, and
   a housing fixture,
   wherein the transducer housing at least indirectly forms at least one contact area in the installed state with the housing fixture, the transducer housing and the housing fixture being at least indirectly pressed against one another in a first contact area with existing, but as slight as possible surface pressure by a pre-loading means, and wherein the housing fixture comprises a first fixture element and a second fixture element, wherein the transducer housing runs through the first fixture element, a shoulder of the first fixture element and a shoulder of the second fixture element are opposite one another on one side of the first fixture element, and in an area of an opposite side of the first fixture element, the second fixture element is connected to the transducer housing in a locking manner opposite the first fixture element and, wherein the second fixture element, 2. Ultrasonic transducer according to claim 1, wherein the at least indirect surface pressure caused by the pre-loading means in the first contact area is less than 10 MPa.

3. Ultrasonic transducer according to claim 2, wherein the at least indirect surface pressure caused by the pre-loading means in the first contact area is greater than 0.005 MPa.

4. Ultrasonic transducer according to claim 1, wherein the at least indirect surface pressure caused by the pre-loading means in the first contact area is less than 5 MPa.

5. Ultrasonic transducer according to claim 4, wherein the at least indirect surface pressure caused by the pre-loading means in the first contact area is greater than 0.05MPa.

6. Ultrasonic transducer according to claim 1, wherein the second fixture element is a positive-locking retaining ring.

7. Ultrasonic transducer according to claim 1, wherein the pre-loading means is provided between the first fixture element and the second fixture element and is supported on the first fixture element and, on either the second fixture element or the transducer housing.

8. Ultrasonic transducer according to claim 7, wherein the second fixture element is screwed into the first fixture element and the pre-loading means is implemented by interaction of a thread of the second fixture element with the corresponding pitch of the first fixture element.

9. Ultrasonic transducer according to claim 8, wherein the thread between the first fixture element and the second fixture element is constructed in a manner causing the contact surface of the thread has a maximum surface pressure caused by the pre-loading means of less than 10MPa and the contact surface of the thread has a minimum surface pressure caused by the pre-loading means of at least 0.001 MPa.

10. Ultrasonic transducer according to claim 8, wherein the thread between the first fixture element and the second fixture element is constructed in a manner causing the contact surface of the thread has a maximum surface pressure caused by the pre-loading means of less than 5 MPa and the contact surface of the thread has a minimum surface pressure caused by the pre-loading means of at least 0.05 MPa.

11. Ultrasonic transducer according to claim 1, wherein the pre-loading means is formed as a spring washer.

12. Ultrasonic transducer for installation in an instrument housing, comprising:
    a transducer housing, the transducer housing being exposed in an installed state thereon, on at least one of an emitting and a receiving side thereof, to pressure exerted by a medium, and
    a housing fixture, wherein the transducer housing at least indirectly forms at least one contact area in the installed state with the housing fixture, the transducer housing and the housing fixture being at least indirectly pressed against one another in a first contact area with existing, but as slight as possible surface pressure by a pre-loading means, wherein the housing fixture comprises a first fixture element and a second fixture element, wherein the first fixture element and the second fixture element form a free space, in an assembled state, in which a section of the transducer housing is mounted, and wherein the section of the transducer housing is supported in a direction opposite a resulting pressure load on the first fixture element and on the second fixture element.

13. Ultrasonic transducer according to claim 12, wherein the first fixture element is formed by a section of the instrument housing provided with a recess, wherein the transducer housing is inserted in the recess of the instrument housing and the second fixture element is formed by a sleeve is inserted in the recess of the section of the instrument housing and can is connected with said section of the instrument housing.

14. Ultrasonic transducer for installation in an instrument housing, comprising:
    a transducer housing, the transducer housing being exposed in an installed state thereon, on at least one of an emitting and a receiving side thereof, to pressure exerted by a medium, and
    a housing fixture, wherein the transducer housing at least indirectly forms at least one contact area in the installed state with the housing fixture, the transducer housing and the housing fixture being at least indirectly pressed against one another in a first contact area with existing, but as slight as possible surface pressure by a pre-loading means, wherein the transducer housing and the housing fixture are spaced from one another by a gap in the installed state in a direction of a resulting pressure load, wherein at least one acoustic decoupling element is arranged in the gap, and wherein at least one of the material and dimensions of the decoupling element are such that as low as possible acoustic impedance matching is implemented at least one of between the transducer housing and the decoupling element and between the decoupling element and the housing fixture.

15. Ultrasonic transducer according to claim 14, wherein said at least one acoustic decoupling element comprises at least two acoustic decoupling elements arranged adjacent to one another in a free space in the direction of the resulting pressure load.

* * * * *